United States Patent [19]
Kamiyamaguchi et al.

[11] 3,863,241
[45] Jan. 28, 1975

[54] YARN BREAK DETECTOR UTILIZING A SENSOR FOR SENSING THE YARN STATIC ELECTRICITY

[75] Inventors: Masaru Kamiyamaguchi, Yokohaam; Kazuyoshi Nakagawa, Tokyo; Masana Nishimura, Kawasaki, all of Japan

[73] Assignee: Yamatake-Honeywell Company Limited, Tokyo, Japan

[22] Filed: Mar. 26, 1973

[21] Appl. No.: 344,661

[30] Foreign Application Priority Data
Mar. 25, 1972 Japan.............................. 47-29955

[52] U.S. Cl.................... 340/259, 66/163, 226/11, 226/100, 242/37 R
[51] Int. Cl....................... D04b 35/16, B65h 63/00
[58] Field of Search............. 340/259; 226/100, 11; 242/37 R; 57/81; 66/163

[56] References Cited
UNITED STATES PATENTS

| | | |
|---|---|---|
| 3,391,840 | 7/1968 | Ling..................................... 226/11 |
| 3,562,734 | 2/1971 | Hotchkiss ........................... 340/259 |
| 3,611,342 | 10/1971 | Raaben et al....................... 340/259 |
| 3,688,958 | 9/1972 | Rydborn ............................. 226/11 |
| 3,734,422 | 5/1973 | Loepfe............................. 242/37 R |
| 3,774,860 | 11/1973 | Loepfe............................. 242/37 R |

*Primary Examiner*—Glen R. Swann, III
*Attorney, Agent, or Firm*—Trevor B. Joike; Henry L. Hanson

[57] ABSTRACT

A yarn break detector of the sampling type has a collecting electrode type sensor to which a continuously moving yarn is lightly contacted. Current, based on charges of static electricity generated by the sensor, flow through a DC to pulse converter so as to be converted to a corresponding voltage which in turn is converted to a pulse signal when a sampling switch of the DC to pulse converter is closed. The pulse amplitude of the converted pulse is changed depending upon the presence or absence of the yarn to be monitored. Said converted pulse signal is then transmitted to a signal handling circuit which detects a predetermined pulse signal relating to the absence of the yarn and amplifies it so as to operate a load such as an alarm, thereby detecting the condition that the yarn has broken.

3 Claims, 3 Drawing Figures

A YARN BREAK DETECTOR UTILIZING A SENSOR FOR SENSING THE YARN STATIC ELECTRICITY

BACKGROUND OF THE INVENTION

In the textile industry and continuously moving threads, yarns, fibers are monitored during many processes, for example, the spinning process, the spooling process and the weaving process so as to ensure the smooth operation thereof.

The break or cutting off of continuously moving threads, yarns, fibers or the like must be quickly and surely detected.

Heretofore, a mechanical yarn break detector and an optical yarn break detector have been known. The mechanical detector includes a plunger on which the tension of the yarn is applied and a pair of electric contacts which are actuated by said plunger in case the yarn break occurs. The optical detector ordinarily comprises a light source and a light sensor for sensing the variation of quantity of receiving light from the light source via the yarn to be monitored, and produces an alarm signal when the quantity of the receiving light has reached the predetermind value. The mechanical detector is most popular because of low cost, but is extremely low in the reliability. By contrast, the optical detector is reliable but expensive. Further, such mechanical and optical detectors cannot be employed when the speed of the moving yarn is very high and/or the diameter thereof is extremely small. In short, the desired yarn break detector with high reliability and low cost has not been obtained as yet.

After careful investigation, the inventor observed that yarns which continously travel through or on guide rollers, guide pins or the like accumulate static electricity due to friction. Normally, this static electricity is removed because it disturbs the manufacturing process and lower the quality of the product. However, in spite of removing this static charge, charge actually remains on the yarn that reaches the order of $10^{-8}$ to $10^{-9}$ Coulomb/m. Ordinarily, the yarn speed in a manufacturing machine is of the order of 1,000 m/minute to 5,000 m/minute; consequently, it is considered that currents to be collected from the charged yarn will reach the order of $1.7 \times 10^{-7}$ A to $8.3 \times 10^{-7}$ A.

SUMMARY OF THE INVENTION

The present invention relates to an electronic yarn break detector of sampling type which is based on the fact that the yarn possesses usable charges of the order of $10^{-8}$ to $10^{-7}$ Coulomb/m.

The present yarn break detector comprises a collecting electrode type sensor, a DC to pulse signal converter and a signal handling circuit. The DC to pulse signal converter comprises a current to voltage converter and a sampling switch. The current to voltage converter has a parallel circuit of a high resistor and a charging capacitor connected between the sensor and a common line. The sampling switch may be a field effect transistor which connects its source to a junction between the sensor and the current to voltage converter and its drain to an input terminal of the signal handling circuit.

A continuously moving yarn to be monitored lightly contacts the collecting electrode type sensor so that charges of static electricity are generated on the sensor. The sensor constantly supplies positive charges of electricity, in this embodiment, to the DC to pulse converter, thereby producing constant currents flowing through the high resistor which in turn converts the currents to a voltage signal. The parallel capacitor instantly charges or stores an amount of charge corresponding to the voltage drop across the high resistor. When the sampling switch is closed, the voltage signal on the junction of the sensor and the current to voltage converter is further converted to a pulse signal which then is transmitted to the signal handling circuit so as to be processed for detecting a pulse showing the yarn break condition and further utilizing such a pulse to actuate an alarm.

A general object of this invention is to provide a new electronic yarn break detector.

Another object of this invention is to provide an electronic yarn break detector of the sampling type.

A further object of this invention is to provide an electronic yarn break detector which will collect charges of static electricity generated by friction on a collecting electrode type sensor, produce constant currents depending upon the charges, convert the currents to a voltage, further convert the voltage to a pulse signal the amplitude of which changes in accordance with the presence or absence of running yarn to be monitored and handle the pulse signal so as to actuate an alarm or the like.

A further object of this invention is to provide a new DC to pulse converter for the above mentioned electronic yarn break detector of the sampling type.

A further object of this invention is to provide an electronic yarn break detector with high reliability.

A further object of this invention is to provide an electronic yarn break detector with low cost by way of utilizing a conventional comparator of low input impedance as an input stage to the signal handling circuit.

DESCRIPTION OF THE PREFERRED EMBODIMENT

Figure 1:
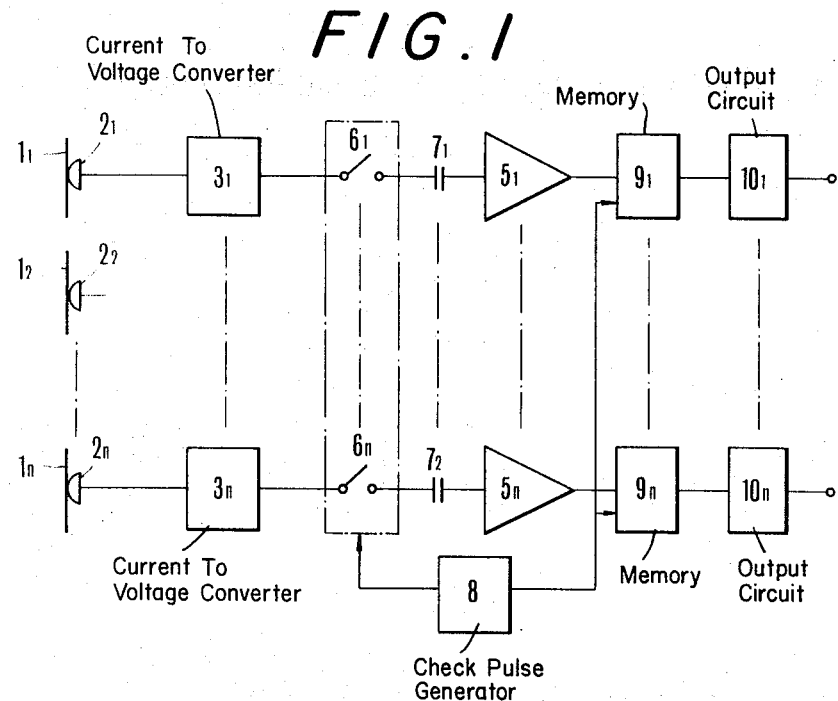
FIG. 1 is the block diagram showing the basic arrangement of a yarn break detector of this invention.

In FIG. 1, a collecting electrode type sensor $2_1$ is arranged to lightly contact the continuously moving yarn $1_1$. A current to voltage converter $3_1$ connects its input to the collecting electrode type sensor $2_1$ and its output to an input of a comparator $5_1$ through a sampling switch $6_1$ and a coupling capacitor $7_1$. An output signal of the comparator $5_1$ is transmitted to a memory circuit $9_1$ which in turn applies its output to an output circuit $10_1$ arranged to actuate a load (not shown). A check pulse generator 8 supplies checking pulses to the sampling switch $6_1$ and the memory circuit $9_1$ synchronously. The No. 2 yarn $1_2$ is monitored by the No. 2 detector having another sensor $2_2$. Also the No. $n$ yarn $1n$ is monitored by the No. $n$ detector comprised of a sensor $2n$, a current to voltage converter $3n$, a sampling switch $6n$, a coupling capacitor $7n$, a comparator $5n$, a memory circuit $9n$ and an output circuit $10n$.

With such an arrangement, friction made between the sensor $2_1$ and the continuously moving yarn $1_1$ generates charges of static electricity on the sensor 21 which are then transmitted to the current to voltage converter $3_1$ in which the currents based on the transmitted charges are converted into a corresponding voltage and stored therein. When a checking pulse closes the sampling switch $6_1$, the corresponding voltage of the current to voltage converter $3_1$ is transmitted to the comparator $5_1$ through the sampling switch $6_1$ and the coupling capacitor $7_1$. The comparator $5_1$ then compares the voltage transmitted from the current to voltage converter $3_1$ with a reference voltage signal and produces an output signal in accordance with the result of the comparison which in turn is applied to the memory circuit $9_1$ (being in an operable state by way of receiving a checking pulse from the check pulse generator 8 in synchronization with the sampling switch $6_1$) and stored therein. As the memory circuit $9_1$ holds the stored signal between the non-sampling period, the stored signal is applied to the output circuit $10_1$ so as to operate the load, such as an alarm, even if the sampling period has terminated. The sampling system is very effective for preventing false operation due to undesired information or noise to be fed to the output circuit $10_1$. Detectors for yarns $1_2$ to $1n$ operate as same as the detector for yarn $1_1$.

Figure 2:
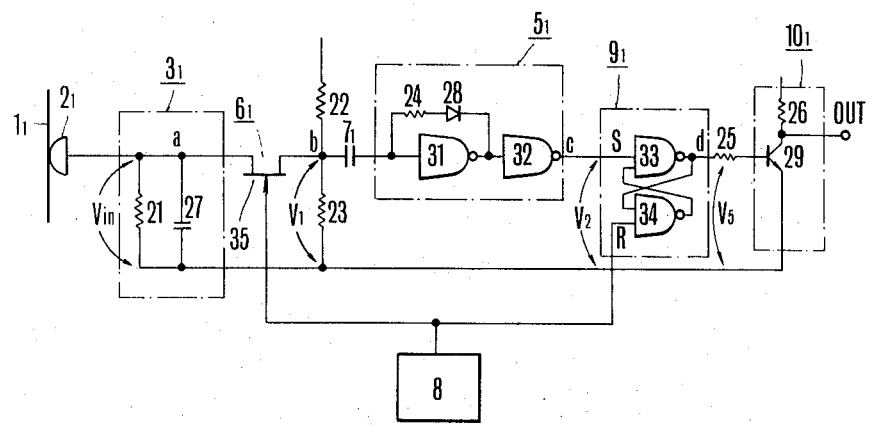
FIG. 2 is a circuit diagram showing one embodiment of the yarn break detector of FIG. 1.

FIG. 2 shows one embodiment of the present yarn break detector for yarn $1_1$. The detectors for yarns $1_2$ to $1n$ may be the same as the detector for yarn $1_1$. In FIG. 2, the current to voltage converter $3_1$ comprises a parallel circuit of a resistor 21 and a charging capacitor 27 having one end connected to a common line and the other end to the sensor $2_1$. The sampling switch $6_1$ is a field effect transistor 35 which has its gate connected to the check pulse generator 8, its source to the other end of the current to voltage converter $3_1$ and its drain to the input terminal of the comparator $5_1$ through the coupling capacitor $7_1$. The comparator $5_1$ has a first NAND gate 31 having a feedback circuit for one polarity output so as to provide a high gain for a negative input pulse and a low gain for a positive input thereof and a second NAND gate 32 connected in series to the first NAND gate 31. A voltage divider formed by resistors 22 and 23 acts as a reference voltage means which operates with the DC to pulse converter so as to produce a positive or negative pulse on a junction b thereof connected to the drain of the field effect transistor 35 and also to the input terminal of the first NAND gate 31 through the coupling capacitor $7_1$. The reference voltage means is not shown in the FIG. 1 block diagram, because it is a supplementary component of the present detector. However in case of utilizing the NAND gates 31 and 32 as the comparator $5_1$, said reference voltage means is an essential component. The memory circuit $9_1$ is a flip-flop comprising a pair of NAND gates 33 and 34 which has its set terminal S connected to the output terminal of the comparator $5_1$ and its reset terminal R to the check pulse generator 8. An npn transistor 29 of the output circuit $10_1$ has its base connected to the output terminal d of the memory circuit $9_1$ through a resistor 25, its collector to an output terminal OUT of this detector and also to a voltage source of adequate level which may be connected by one end to the resistor 22 of the reference voltage means and its electrode to the common line to which one end of the resistor 23 of the reference voltage means and one end of the current to voltage converter 31 are commonly connected.

Figure 3:
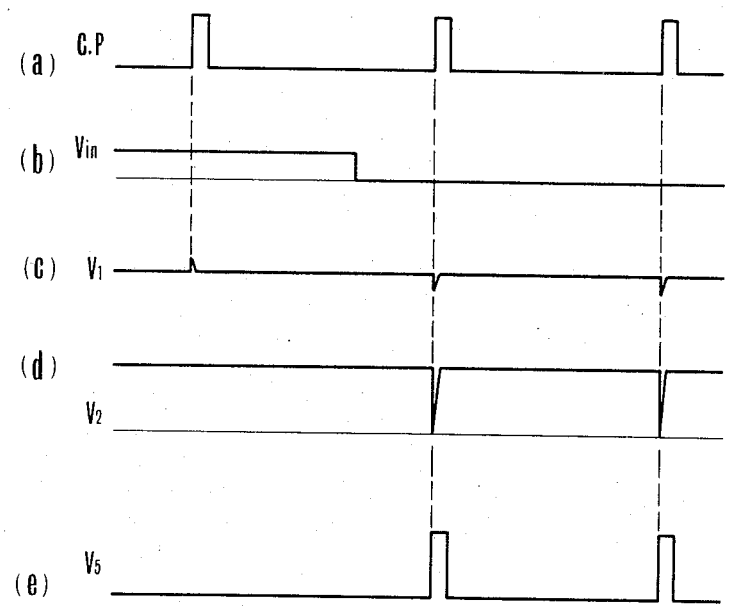
FIG. 3 shows waveforms explanatory of the operation of the FIG. 2 circuit.

Refering now to FIG. 3, the operation of the FIG. 2 circuit will be explained. Electric charges of static electricity by friction between the continuously moving yarn $1_1$ and the collecting electrode type sensor $2_1$ produced constant currents flowing from the sensor $2_1$ to the common line through the resistor 21 having a large value of resistence of the current to voltage converter $3_1$ which then are converted thereby to the corresponding voltage $V_{in}$ as a voltage drop across the high resistor 21. At the same time the charging capacitor of the current to voltage converter $3_1$ stores an corresponding amount of charges to the converted voltage $V_{in}$ during non-sampling. When a checking pulse C.P. (see FIG. $3(a)$) is applied, the field effect transistor 35 becomes into conductive, that is, the sampling switch $6_1$ is closed. Then an output pulse relating to the converted voltage $V_{in}$ is surely obtained on the drain of the field effect transistor 35, namely the output terminal of the DC to pulse converter of this yarn break detector. Now, with the configuration of FIG. 2, the output pulse on the drain of the field effect transistor 35 is a positive or negative pulse as shown in FIG. 3, according to the presence or absence of the yarn to be monitored. That is, in case of closing the sampling switch $6_1$, a junction a of the current to voltage converter $3_1$ is directly connected to a junction b of the reference voltage means. The reference voltage provided by the reference voltage means is selected at a value which will satisfy the following relation: $0 < V1 < Vin$, where $Vin$ is the voltage obtained on the current to voltage converter $3_1$ when the yarn to be monitored is present, namely is running continuously. Consequently, when the sampling switch is closed, the voltage Vin is superimposed on the reference voltage V1 so that a positive pulse (see FIG. 3 (c)) is obtained. This positive pulse is transmitted to the comparator 51 through the coupling capacitor $7_1$. Positive pulses will continue to be generated while the yarn is running against the sensor. However, the comparator 51 does not amplify positive pulses as described above and, the memory circuit 91, therefore, does not change its state.

If the yarn $1_1$ has broken, on the other hand, the charges instantly disappear from the sensor $2_1$ and then the current flowing through the resistor 21 from the sensor $2_1$ to the common line also disappears. Accordingly the charging capacitor 27 discharges so that Vin becomes zero. At this condition, when the sampling switch is closed, this zero voltage of the current to voltage converter $3_1$ is superimposed on the reference voltage thereby producing a negative pulse on the junction b. The comparator $5_1$ amplifies the negative pulse and produces an amplified negative pulse V2 (see FIG. $3(d)$) which then is transmitted to the set terminal S of the memory circuit $9_1$. As the memory circuit has been reset by a reset pulse generated in synchronization with a checking pulse applied to the sampling switch, the amplified negative pulse of the comparator $5_1$ instantly operated the memory circuit of flip-flop type into the SET state thereby producing a shaped pulse (see FIG. 3 (e)) on the output terminal thereof. The output circuit $10_1$ transmits the shaped pulse V5 to a load such as an alarm, thereby certainly and instantly detecting the condition that the yarn to be monitored has broken.

In this manner yarn break condition is surely detected without causing any false operation to occur with noise which may be introduced through the input or a power source and may not drive the output circuit $10_1$ due to the reset state of the memory circuit $9_1$ during non-sampling period by making the actuating of the sampling switch $6_1$ and the resetting of the memory circuit $9_1$ synchronous.

The embodiments of the invention in which an exclusive property or right is claimed are defined as follows:

1. A yarn break detector of the sampling type comprising; a collecting electrode type sensor to which a continuously moving yarn is lightly contacted, a DC to pulse converter including a current to voltage converter connected to the sensor so as to convert the current resulting from the collection of the static electricity by the sensor to a voltage and a sampling switch connected to the current to voltage converter so that the DC to pulse converter produces an output pulse signal on its output terminal when said sampling switch is closed, a check pulse generator for closing said sampling switch, and a signal handling circuit for processing said output pulse signal so as to operate a load if the yarn being monitored has broken.

2. A yarn break detector as defined in claim 1 wherein said current to voltage converter comprises a resistor and a capacitor connected in parallel for receiving a charging current resulting from the collection of the static electricity by the sensor and converting said current to a voltage signal and wherein said sampling switch converts the voltage signal to a corresponding pulse signal the amplitude of which changes in accordance with the presence or absence of a yarn to be monitored.

3. A yarn break detector as defined in claim 1 wherein said signal handling circuit comprises a comparator of low input impedence having an input for receiving said output pulse signal, a memory circuit having an input connected to the output of said comparator and an output, and an output circuit connected to said output of said memory circuit.

* * * * *